(12) United States Patent
Kim

(10) Patent No.: US 11,649,941 B2
(45) Date of Patent: May 16, 2023

(54) LAMP FOR VEHICLE AND VEHICLE INCLUDING THE SAME

(71) Applicant: HYUNDAI MOBIS CO., LTD., Seoul (KR)

(72) Inventor: Seok Huyn Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/808,528

(22) Filed: Jun. 23, 2022

(65) Prior Publication Data

US 2023/0054635 A1    Feb. 23, 2023

(30) Foreign Application Priority Data

Aug. 23, 2021   (KR) .................. 10-2021-0110817

(51) Int. Cl.
| | |
|---|---|
| *F21S 43/31* | (2018.01) |
| *F21V 7/04* | (2006.01) |
| *F21V 7/00* | (2006.01) |
| *F21V 7/09* | (2006.01) |
| *F21S 43/14* | (2018.01) |

(52) U.S. Cl.
CPC ............ *F21S 43/31* (2018.01); *F21V 7/0033* (2013.01); *F21V 7/048* (2013.01); *F21V 7/09* (2013.01); *F21S 43/14* (2018.01)

(58) Field of Classification Search
CPC ............ F21S 43/30; F21S 43/31; F21S 43/14; F21S 41/337; F21S 41/338; F21S 41/147; F21S 41/148; F21S 41/145; F21S 41/365; F21V 7/048; F21V 7/0033; F21V 7/0041; F21V 7/04; F21V 7/09
See application file for complete search history.

(56) References Cited

U.S. PATENT DOCUMENTS

| | | | |
|---|---|---|---|
| 2001/0003506 A1* | 6/2001 | Natsume ................. | F21V 7/09 |
| | | | 362/346 |
| 2019/0137052 A1* | 5/2019 | Hwang ................. | F21V 7/0083 |

FOREIGN PATENT DOCUMENTS

| | | | | |
|---|---|---|---|---|
| EP | 0942225 A2 | * | 9/1999 | |
| EP | 2119958 A1 | * | 11/2009 | ............ F21S 41/147 |
| JP | H10188613 A | * | 7/1998 | |
| JP | H10228805 A | * | 8/1998 | |
| JP | 2004127689 A | * | 4/2004 | .............. F21S 43/14 |

\* cited by examiner

*Primary Examiner* — Erin Kryukova
(74) *Attorney, Agent, or Firm* — DLA Piper LLP (US)

(57) ABSTRACT

A lamp for a vehicle includes: a light source configured to emit light; and a reflector configured to receive and reflect the light emitted from the light source. The reflector includes a first reflection surface, and a surface of the first reflection surface has an uneven shape in which a plurality of convex regions and a plurality of concave regions are repeated. A recessed section, which is recessed downward, is formed in each of the convex regions of the uneven shape, and a protrusion section, which protrudes upward, is formed in each of the concave regions of the uneven shape.

14 Claims, 6 Drawing Sheets

LAMP FOR VEHICLE AND VEHICLE INCLUDING THE SAME

CROSS-REFERENCE TO RELATED APPLICATION(S)

This application claims priority from and the benefit of Korean Patent Application No. 10-2021-0110817, filed on Aug. 23, 2021, which is hereby incorporated by reference for all purposes as if set forth herein.

TECHNICAL FIELD

Exemplary embodiments relate to a lamp for a vehicle and a vehicle including the lamp and, more specifically to a lamp for a vehicle, capable of forming a three-dimensional lighting image, and a vehicle including the lamp.

BACKGROUND

Recently, research to differentiate a lighting image of a lamp that affects the design of a vehicle is being actively conducted according to demands of consumers for the design of the vehicle. In particular, research on a lamp for a vehicle capable of forming a three-dimensional lighting image beyond a two-dimensional lighting image according to the related art is being actively conducted.

Meanwhile, according to the related art, a method of applying special optical components, such as optical fibers, hologram plates, and lenticular lenses to a lamp for a vehicle was used to form a three-dimensional lighting image. However, since the above-described components are expensive, the manufacturing cost of the lamp capable of forming the three-dimensional lighting image is increased.

SUMMARY

Exemplary embodiments of the present invention provide a lamp for a vehicle capable of forming a three-dimensional lighting image at a low cost.

A first exemplary embodiment of the present invention provides a lamp for a vehicle, the lamp including: a light source configured to emit light; and a reflector configured to receive and reflect the light emitted from the light source, wherein the reflector includes a first reflection surface, and a surface of the first reflection surface has an uneven shape in which a plurality of convex regions and a plurality of concave regions are repeated, wherein a recessed section, which is recessed downward, is formed in each of the convex regions of the uneven shape, and a protrusion section, which protrudes upward, is formed in each of the concave regions of the uneven shape.

Radii of curvature of some of the plurality of recessed sections formed in the plurality of convex regions may be different from radii of curvature of others of the plurality of recessed sections.

Radii of curvature of some of the plurality of protrusion sections formed in the plurality of concave regions may be different from radii of curvature of others of the plurality of protrusion sections.

The plurality of convex regions may be formed such that the curvatures of the recessed sections become smaller as optical paths (L) become longer, wherein each of the optical paths (L) represents the distance the light emitted from the light source travels until arrives at the convex region.

The plurality of convex regions may be formed such that the curvatures of the recessed sections become larger as optical paths (L) become longer, wherein each of the optical paths (L) represents the distance the light emitted from the light source travels until arrives at the convex region.

The plurality of concave regions may be formed such that the curvatures of the protrusion sections become larger as optical paths (L) become longer, wherein each of the optical paths (L) represents the distance the light emitted from the light source travels until arrives at the concave region.

The plurality of concave regions may be formed such that the curvatures of the protrusion sections become smaller as optical paths (L) become longer, wherein each of the optical paths (L) represents the distance the light emitted from the light source travels until arrives at the concave region.

The first reflection surface may be formed such that heights (D) of stepped portions between the convex and concave regions adjacent to each other are constant.

The first reflection surface may face the light source, and the light emitted from the light source may directly arrive at the first reflection surface.

The reflector may further include a second reflection surface that faces the light source, the light emitted from the light source may directly arrive at the second reflection surface, and at least a portion of the light reflected from the second reflection surface may arrive at the first reflection surface.

The reflector may have a bent shape at a region in which the first reflection surface meets the second reflection surface.

A surface of the second reflection surface that faces the light source may have a flat shape.

A second exemplary embodiment of the present invention provides a vehicle including a lamp for a vehicle, wherein the lamp includes: a light source configured to emit light; and a reflector configured to receive and reflect the light emitted from the light source, wherein the reflector includes a first reflection surface, and a surface of the first reflection surface has an uneven shape in which a plurality of convex regions and a plurality of concave regions are repeated, wherein a recessed section, which is recessed downward, is formed in each of the convex regions of the uneven shape, and a protrusion section, which protrudes upward, is formed in each of the concave regions of the uneven shape.

The lamp may be a rear lamp or a signal lamp.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION

Hereinafter, a lamp for a vehicle and the vehicle according to the present disclosure will be described with reference to the drawings.

Lamp for Vehicle

Figure 1:
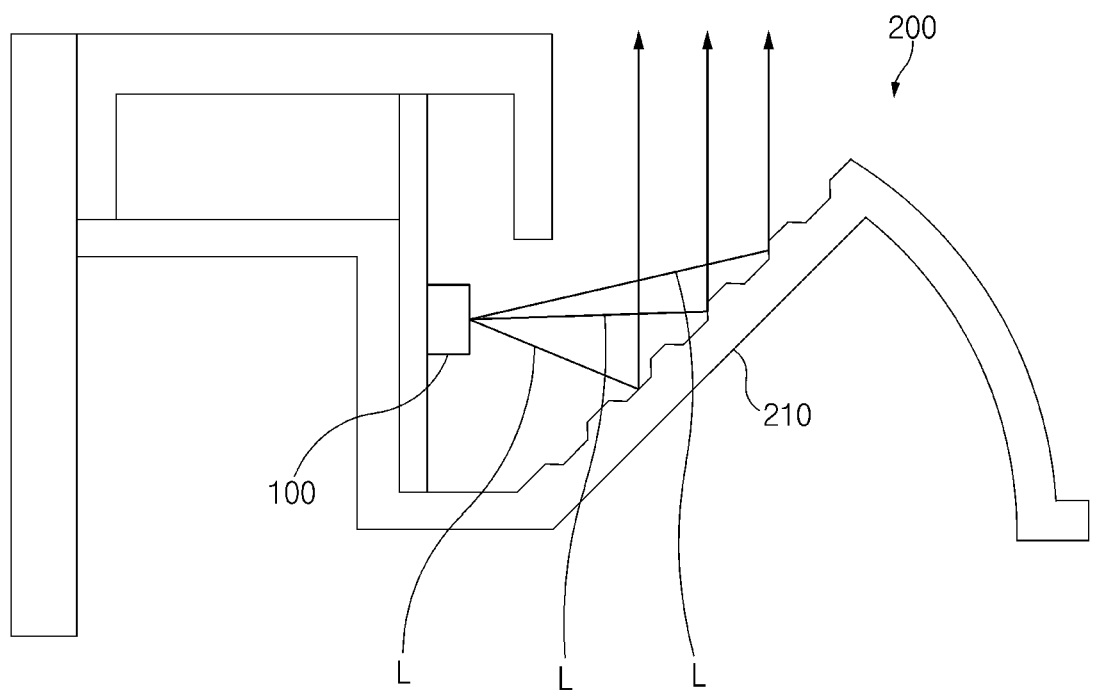
FIG. 1 is a vertical cross-sectional view illustrating a lamp for a vehicle according to an exemplary embodiment of the present disclosure.
Figure 2:
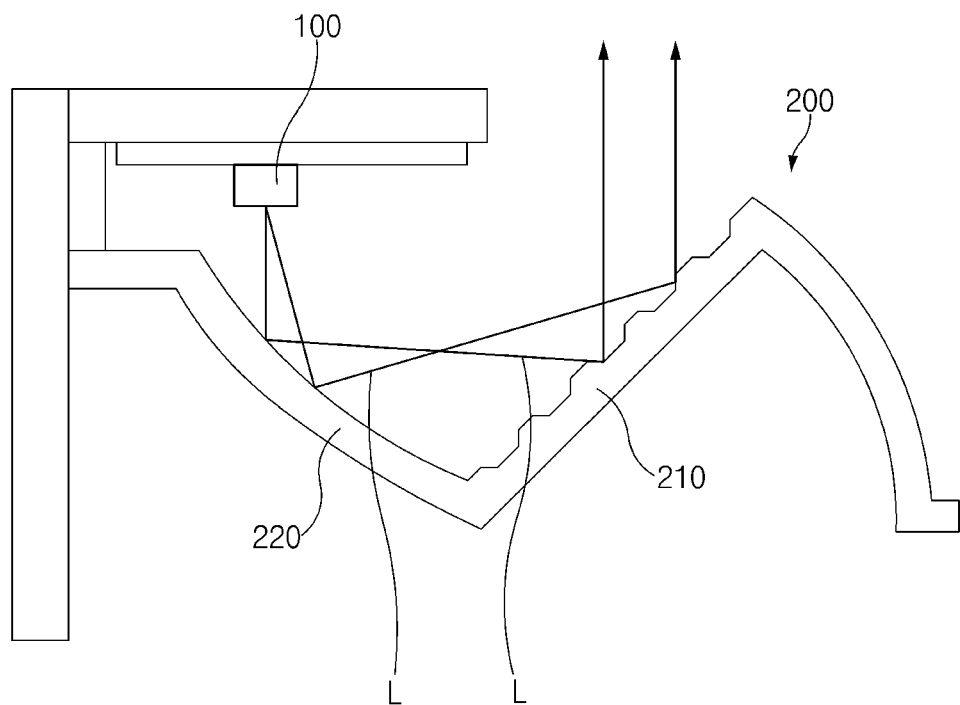
FIG. 2 is a vertical cross-sectional view illustrating a lamp for a vehicle according to another exemplary embodiment of the present disclosure.
Figure 3:
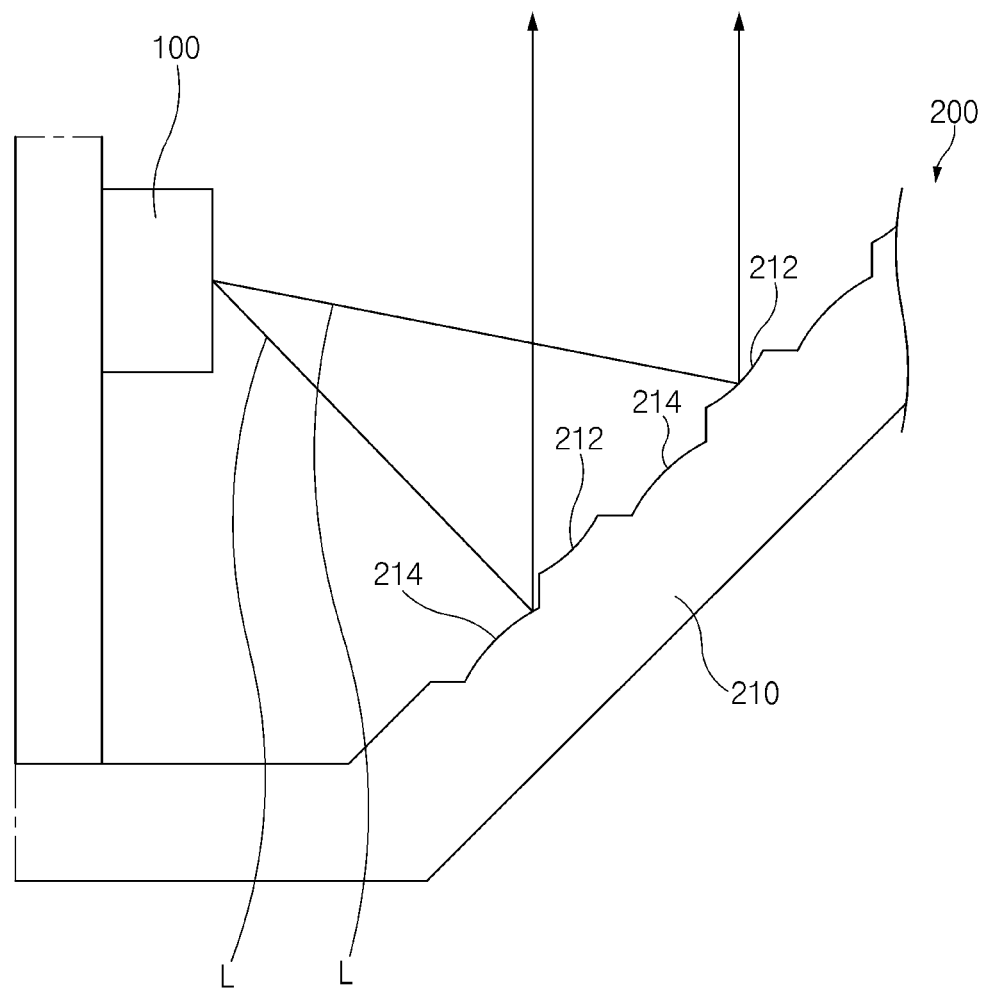
FIG. 3 is an enlarged vertical cross-sectional view illustrating a light source and a first reflection surface which are provided in a lamp for a vehicle according to the present disclosure.
Figure 4:
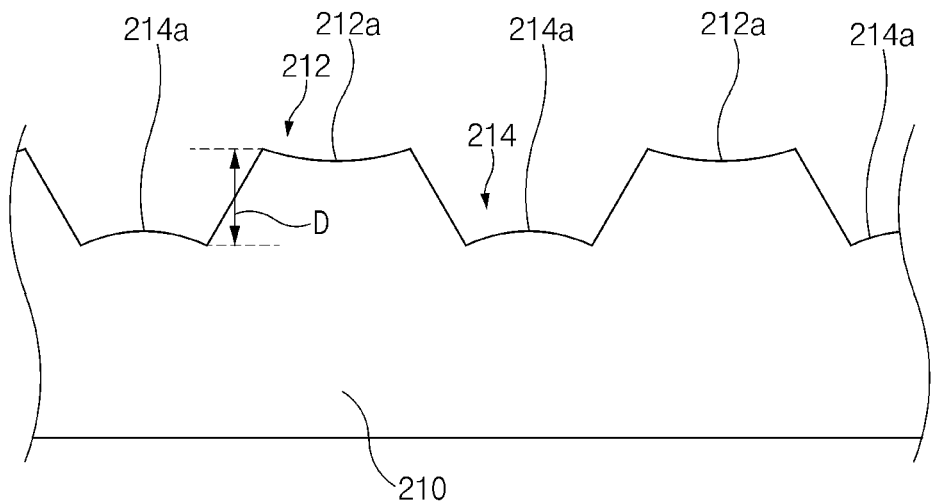
FIG. 4 is an enlarged cross-sectional view illustrating a first reflection surface provided in a lamp for a vehicle according to the present disclosure.

FIG. 1 is a vertical cross-sectional view illustrating a lamp for a vehicle according to an exemplary embodiment of the present disclosure, and FIG. 2 is a vertical cross-sectional view illustrating a lamp for a vehicle according to another exemplary embodiment of the present disclosure. FIG. 3 is an enlarged vertical cross-sectional view illustrating a light source and a first reflection surface which are provided in a lamp for a vehicle according to the present disclosure, and FIG. 4 is an enlarged cross-sectional view illustrating a first reflection surface provided in a lamp for a vehicle according to the present disclosure.

Referring to FIGS. 1 to 4, a lamp 10 for a vehicle (hereinafter, referred to as a 'lamp') according to the present disclosure may include a light source 100 emitting light and a reflector 200 receiving and reflecting the light emitted from the light source 100. The light source 100 may be, for example, an LED, but the type of the light source 100 is not limited thereto.

The reflector 200 may include a first reflection surface 210. The light emitted from the light source 100 is reflected from the first reflection surface 210 and then emitted to the outside to form an lighting image.

In particular, the lamp 10 according to the present disclosure may form a three-dimensional lighting image. To this end, according to the present disclosure, a surface of the first reflection surface 210, more specifically, the surface of the first reflection surface 210 that faces the light source 100 may have an uneven shape in which a plurality of convex regions 212 and a plurality of concave regions 214 are alternately repeated.

More specifically, according to the present disclosure, recessed sections 212*a*, which are recessed downward, may be formed in the respective convex regions 212 of the uneven shape described above, and protrusion sections 214*a*, which protrude upward, may be formed in the respective concave regions 214 of the uneven shape. More preferably, each of the recessed sections 212*a* and the protrusion sections 214*a* may be formed in an upper surface of the first reflection surface 210 at which most of the light emitted from the light source 100 arrives.

According to the present disclosure, the uneven shape including the convex regions 212 and the concave regions 214 is formed on the first reflection surface 210, and a lighting image, which is formed as the light reflected from the first reflection surface 210 is emitted to the outside, may have a three-dimensional shape. More specifically, according to the present disclosure, the recessed section 212*a* is formed in the convex region 212, and the protrusion section 214*a* is formed in the concave region 214. Thus, more differentiated three-dimensional lighting image may be formed when compared to the related art. In particular, according to the present disclosure, the three-dimensional lighting image may be formed by processing only the surface of the reflector without employing special optical components, such as optical fibers, hologram plates, and lenticular lenses. Thus, there may be significant effects in terms of cost reduction and the like.

Meanwhile, according to the present disclosure, the radii of curvature of some of the plurality of recessed sections 212*a* formed in the plurality of convex regions 212 may be different from radii of curvature of others of the plurality of recessed sections 212*a*, and the radii of curvature of some of the plurality of protrusion sections 214*a* formed in the plurality of concave regions 214 may be different from radii of curvature of others of the plurality of protrusion sections 214*a*.

More specifically, according to one example of the present disclosure, the plurality of convex regions 212 may be formed such that the curvatures of the recessed sections 212*a* become smaller as optical paths L become longer, wherein each of the optical paths L represents the distance the light emitted from the light source 100 travels until arrives at the convex region 212. The plurality of concave regions 214 may be formed such that the curvatures of the protrusion sections 214*a* become larger as optical paths L become longer, wherein each of the optical paths L represents the distance the light emitted from the light source 100 travels until arrives at the concave region 214. As the optical path L becomes smaller, a large light diffusion occurs when the light reflected from the first reflection surface 210 is emitted to the outside. On the other hand, as the optical path L becomes larger, a small light diffusion occurs when the light reflected from the first reflection surface 210 is emitted to the outside. Thus, brightness for each region of the lighting image may be uniformly formed. Therefore, according to one example of the present disclosure, the brightness of the lighting image, which is formed by the lamp 10, may be formed uniformly for each region.

However, according to another example of the present disclosure unlike the above, the plurality of convex regions 212 may be formed such that the curvatures of the recessed sections 212*a* become larger as optical paths L become longer, wherein each of the optical paths L represents the distance the light emitted from the light source 100 travels until arrives at the convex region 212. The plurality of concave regions 214 may be formed such that the curvatures of the protrusion sections 214*a* become smaller as optical paths L become longer, wherein each of the optical paths L represents the distance the light emitted from the light source 100 travels until arrives at the concave region 214. Unlike the above-described example according to the present disclosure, the difference in brightness for each region of the lighting image may be maximized to differentiate the lighting image.

Meanwhile, referring to FIG. 4, the first reflection surface 210 may further include a stepped portion which is formed in a boundary between the convex region 212 and the concave region 214 adjacent to each other. Here, a height D of the stepped portion mentioned above may be uniformly formed over all the stepped portions formed in boundaries between the convex regions 212 and the concave regions 214.

Continuing to refer to FIG. 1, the first reflection surface 210 in the lamp 10 according to one example of the present disclosure may receive the light directly from the light source 100. That is, according to one example of the present disclosure, the first reflection surface 210 may face the light source 100, and the light emitted from the light source 100 may directly arrive at the first reflection surface 210. Here, the feature, in which the light directly arrives at the first reflection surface 210, may be understood as that the light arrives at the first reflection surface 210 after passing through air on the basis of straightness of light without passing through another optical component.

However, referring to FIG. 2 unlike the above, a first reflection surface 210 in a lamp 10 according to another example of the present disclosure may receive light indirectly from a light source 100. That is, according to another example of the present disclosure, a reflector 200 may further include a second reflection surface 220 that faces the light source 100. Here, the light emitted from the light source 100 directly arrives at the second reflection surface 220, and at least a portion of the light reflected from the second reflection surface 220 may arrive at a first reflection surface 210.

More specifically, the reflector 200 may have a bent shape at a region in which the first reflection surface 210 meets the second reflection surface 220. Also, unlike the first reflection surface 210 in which convex regions 212 and concave regions 214 are repeatedly formed, a surface of the second reflection surface 220 that faces the light source 100 may have a flat shape.

Meanwhile, the lamp 10 according to the present disclosure may be a rear lamp or a signal lamp. However, the lamp 10 may also be used in a head lamp.

Figure 5:
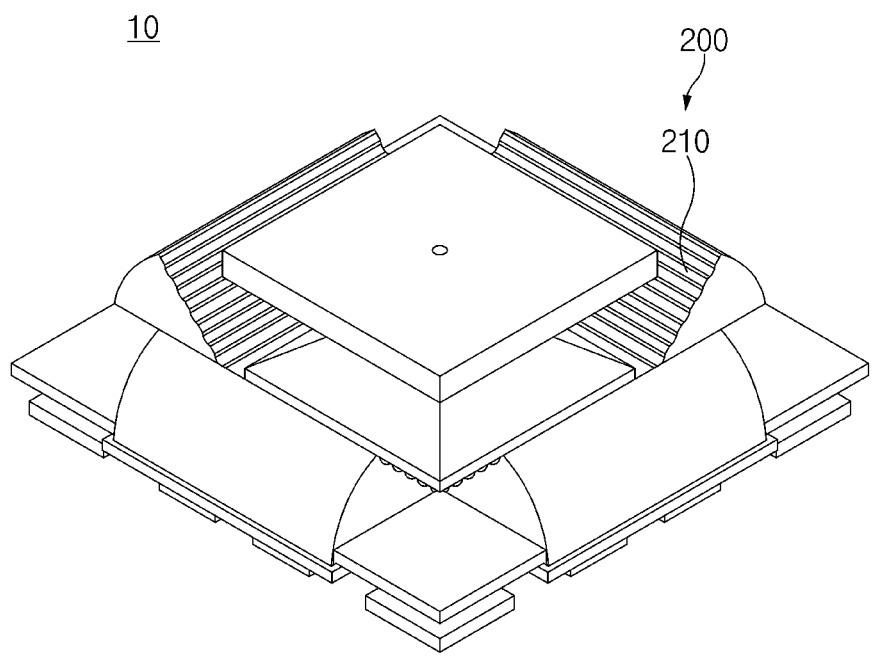
FIG. 5 is a perspective view illustrating one example of a lamp for a vehicle according to the present disclosure.
Figure 6:
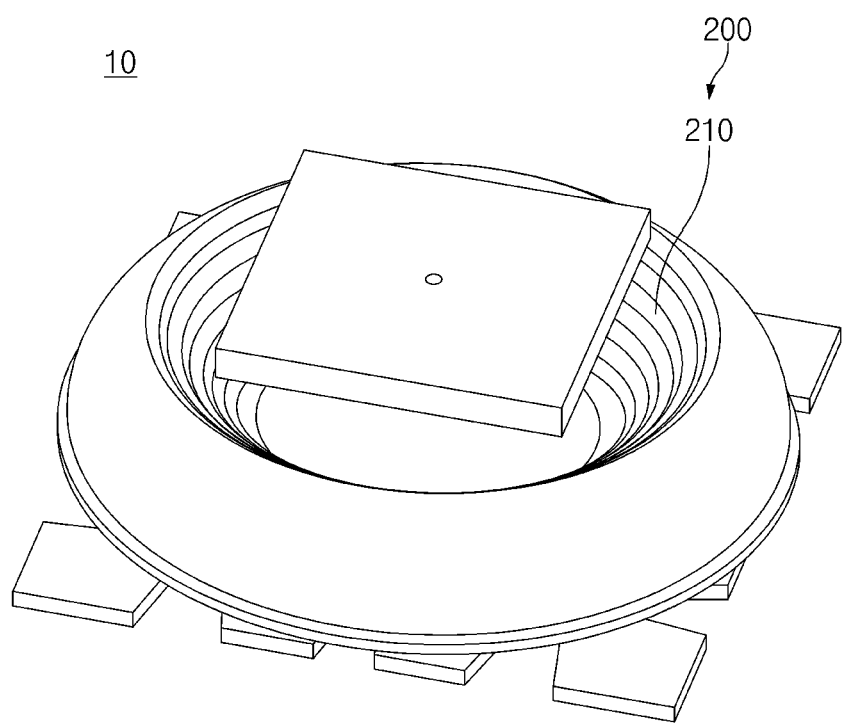
FIG. 6 is a perspective view illustrating another example of a lamp for a vehicle according to the present disclosure.

FIG. 5 is a perspective view illustrating one example of a lamp for a vehicle according to the present disclosure, and FIG. 6 is a perspective view illustrating another example of a lamp for a vehicle according to the present disclosure.

Referring to FIG. 5, a first reflection surface 210 provided in a lamp 10 according to one example of the present disclosure is rotatable. That is, according to one example of the present disclosure, the first reflection surface 210 can be rotated by mechanical movement, and thus a lighting image formed by the lamp 10 may also be variable.

On the other hand, referring to FIG. 6, a first reflection surface 210 provided in a lamp 10 according to another example of the present disclosure may be fixed. In this case, a lighting image formed by the lamp 10 may be fixed.

Vehicle

A vehicle according to the present disclosure may include a lamp 10 for a vehicle (hereinafter, referred to as a 'lamp').

The lamp 10 may include a light source 100 emitting light and a reflector 200 receiving and reflecting the light emitted from the light source 100.

Here, the reflector 200 may include a first reflection surface 210, and a surface of the first reflection surface 210 may have an uneven shape in which a plurality of convex regions 212 and a plurality of concave regions 214 are repeated. Also, recessed sections 212a, which are recessed downward, may be formed in the respective convex regions 212 of the uneven shape, and protrusion sections 214a, which protrude upward, may be formed in the respective concave regions 214 of the uneven shape.

Also, the lamp 10 provided in the vehicle according to the present disclosure may be a rear lamp or a signal lamp.

Meanwhile, the contents described above with respect to the lamp according to the present disclosure may also be applied, in the same manner, to the lamp provided in the vehicle according to the present disclosure.

According to the present disclosure, the lamp for a vehicle may be provided, which forms the three-dimensional lighting image at the low cost.

Although the present disclosure has been described with specific exemplary embodiments and drawings, the present disclosure is not limited thereto, and it is obvious that various changes and modifications may be made by a person skilled in the art to which the present disclosure pertains within the technical idea of the present disclosure and equivalent scope of the appended claims.

What is claimed is:

1. A lamp for a vehicle, the lamp comprising:
   a light source configured to emit light; and
   a reflector configured to receive and reflect the light emitted from the light source,
   wherein the reflector comprises a first reflection surface, and a surface of the first reflection surface has an uneven shape in which a plurality of convex surface regions and a plurality of concave surface regions are repeated, wherein a recessed section, which is recessed inward, is formed in each of the convex surface regions of the uneven shape, and a protrusion section, which protrudes outward, is formed in each of the concave surface regions of the uneven shape.

2. The lamp of claim 1, wherein radii of curvature of some of the plurality of recessed sections are different from radii of curvature of others of the plurality of recessed sections.

3. The lamp of claim 2, wherein the plurality of convex surface regions are formed such that the curvatures of the recessed sections become smaller as optical paths become longer, and each of the optical paths represents a distance the light emitted from the light source travels until it arrives at the convex surface region.

4. The lamp of claim 2, wherein the plurality of convex surface regions are formed such that the curvatures of the recessed sections become larger as optical paths become longer, and each of the optical paths represents a distance the light emitted from the light source travels until it arrives at the convex surface region.

5. The lamp of claim 1, wherein radii of curvature of some of the plurality of protrusion sections are different from radii of curvature of others of the plurality of protrusion sections.

6. The lamp of claim 5, wherein the plurality of concave surface regions are formed such that the curvatures of the protrusion sections become larger as optical paths become longer, and each of the optical paths represents a distance the light emitted from the light source travels until it arrives at the concave surface region.

7. The lamp of claim 5, wherein the plurality of concave surface regions are formed such that the curvatures of the protrusion sections become smaller as optical paths become longer, and each of the optical paths represents a distance the light emitted from the light source travels until it arrives at the concave surface region.

8. The lamp of claim 1, wherein the first reflection surface is formed such heights of stepped portions between the convex and concave surface regions adjacent to each other are constant.

9. The lamp of claim 1, wherein the first reflection surface faces the light source, and
   the light emitted from the light source directly arrives at the first reflection surface.

10. The lamp of claim 1, wherein the reflector further comprises a second reflection surface that faces the light source,
    the light emitted from the light source directly arrives at the second reflection surface, and
    at least a portion of the light reflected from the second reflection surface arrives at the first reflection surface.

11. The lamp of claim 10, wherein the reflector has a bent shape at a region in which the first reflection surface meets the second reflection surface.

12. The lamp of claim 10, wherein a surface of the second reflection surface that faces the light source has a flat shape.

13. A vehicle comprising a lamp for a vehicle, wherein the lamp comprises:
   a light source configured to emit light; and
   a reflector configured to receive and reflect the light emitted from the light source,
   wherein the reflector comprises a first reflection surface, and a surface of the first reflection surface has an uneven shape in which a plurality of convex surface regions and a plurality of concave surface regions are repeated, wherein a recessed section, which is recessed inward, is formed in each of the convex surface regions of the uneven shape, and a protrusion section, which protrudes outward, is formed in each of the concave surface regions of the uneven shape.

14. The vehicle of claim 13, wherein the lamp is a rear lamp or a signal lamp.

* * * * *